(12) United States Patent
Stewart

(10) Patent No.: US 7,056,583 B2
(45) Date of Patent: Jun. 6, 2006

(54) FLYASH COATING

(75) Inventor: James Stewart, Monticello, MN (US)

(73) Assignee: International Pozzlan Coating Corp., Monticello, MN (US)

( * ) Notice: Subject to any disclaimer, the term of this patent is extended or adjusted under 35 U.S.C. 154(b) by 204 days.

(21) Appl. No.: 10/454,771

(22) Filed: Jun. 4, 2003

(65) Prior Publication Data
US 2004/0247913 A1 Dec. 9, 2004

(51) Int. Cl.
*B32B 5/16* (2006.01)

(52) U.S. Cl. .................. 428/402; 428/404; 428/294.7; 264/42; 264/100; 264/157; 264/158; 264/337

(58) Field of Classification Search .............. 428/402, 428/404, 294.7; 264/42, 100, 157, 158, 337
See application file for complete search history.

(56) References Cited

U.S. PATENT DOCUMENTS

| | | | |
|---|---|---|---|
| 6,409,855 B1 * | 6/2002 | Gregg et al. ............ | 156/43 |
| 6,416,619 B1 * | 7/2002 | Gregg et al. ............ | 156/346 |
| 6,421,973 B1 * | 7/2002 | Gregg et al. ............ | 52/481.1 |
| 6,682,617 B1 * | 1/2004 | Gregg et al. ............ | 156/40 |

* cited by examiner

*Primary Examiner*—Leszek B Kiliman
(74) *Attorney, Agent, or Firm*—Schwegman, Lundberg, Woessner & Kluth, P.A.

(57) ABSTRACT

The present invention includes a coating. The coating includes flyash in a concentration of 25 to 70 percent by weight; Portland cement; silica; and a curing agent. The coating optionally includes one or more of chopped nylon fiber; styrene; and, rubber.

16 Claims, 1 Drawing Sheet

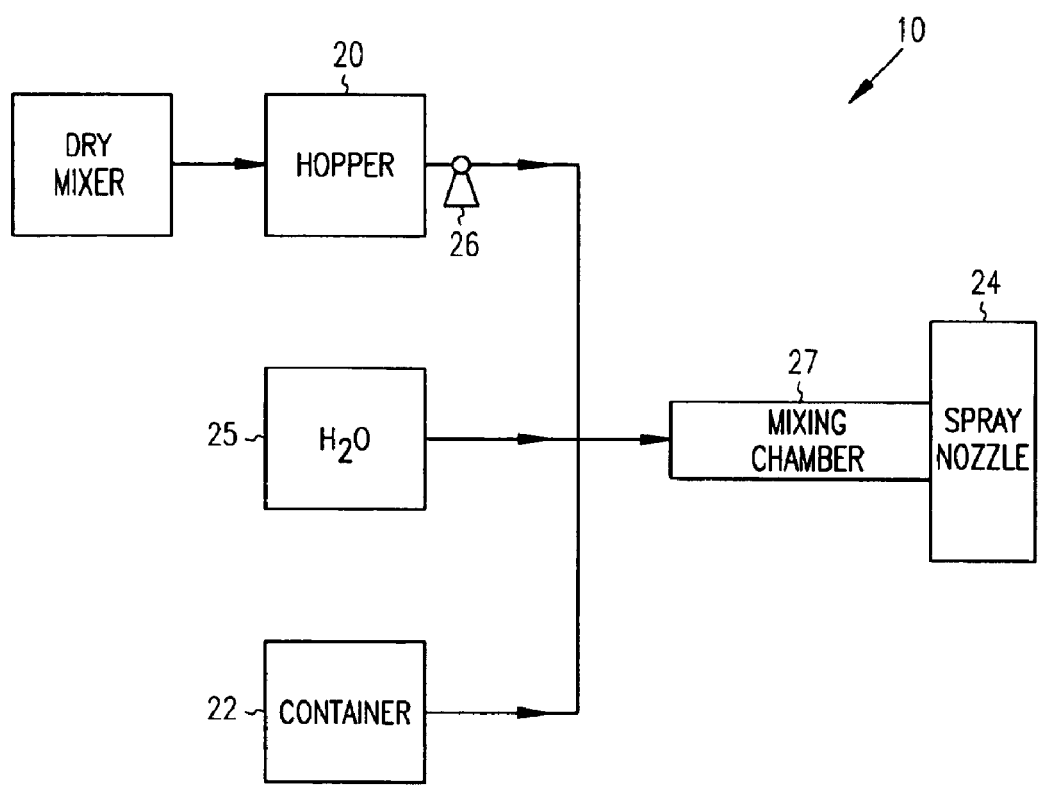

FLYASH COATING

BACKGROUND OF THE INVENTION

The present invention relates to a flyash coating, to a method for making the coating and to a method for protecting structures such as utility poles and transmission towers from damage due to fire, wind, animals and birds, such as woodpeckers.

Damaged and destroyed utility poles and transmission towers have been a problem for utilities for many years. In the spring and summer of 2002, for instance, Canadian and American utilities lost thousands of utility poles and transmission towers in forest fires that raged in remote regions of Canada and the American West. Utility pole losses due to fire are not unique to 2002, however, and the losses are an ongoing problem.

Utility poles are also subject to damage from wild animals. Birds, such as woodpeckers, have also been responsible for damage and failure of utility poles.

Typically, the poles and towers are located in remote parts of the world. As a result, expenses are increased in repairing or replacing the poles and towers. The remoteness also contributes to difficulty encountered in making the repair or replacement.

Devices employed to provide some protection to utility poles include an elastic band described in Japanese Abstract 1996000355853, published Dec. 25, 1996. The elastic band protects the utility pole from damage due to collision by a roadside tree or resulting from accident caused by a road control work vehicle such as a snow removing vehicle. The elastic band is made of rubber and is optionally reinforced with plies of cloth. Another device described in WO1998US0010071 a fabric that is wrapped over the pole.

DESCRIPTION OF THE DRAWINGS

FIG. 1 is a schematic view of one coating application device of the present invention.

SUMMARY

One embodiment of the present invention includes a coating. The coating includes flyash in a concentration of 25 to 70 percent by weight; Portland cement; silica; a curing agent; and optionally, one or more of chopped nylon fiber; styrene; and, rubber.

Another embodiment of the present invention includes a method for applying a coating to a wood-based structure. The method includes preparing a slurry comprising flyash, Portland cement, silica, a curing agent, and optionally, one or more of chopped nylon fiber, styrene, and rubber; adding the slurry to a sprayer; and spraying the slurry onto the wood-based structure.

One other embodiment of the present invention includes a system for applying a coating to a wood-based structure. The system includes a conveying device for conveying coating ingredients to a preselected location; and a delivery device for delivering the coating to the wood-based structure.

One other embodiment includes a coating kit. The coating kit includes a container and dry ingredients of the coating of the present invention. The coating kit also includes a second container and curing agent contained in the second container.

DETAILED DESCRIPTION

In its product aspect, the present invention includes a coating for utility poles and transmission towers. The present invention also includes utility poles and transmission towers coated with the coating of the present invention. The present invention also includes other outside structures, vulnerable to damage by fire, birds, and insects, treated with the coating of the present invention. The present invention also includes a coated utility pole, a coated transmission tower, and other wood-based surfaces that are coated with the coating of the present invention. In one embodiment, the coating of the present invention includes flyash, Portland cement, sand, and a curing agent. In one embodiment, the curing agent is Nippon PolyPlex. Nippon PolyPlex includes an acrylic polymer emulsion, and is manufactured by UniChem of Haw River, N.C.

One exemplary formulation of the coating of the present invention is as follows:

| Ingredient | Percent by Weight |
| --- | --- |
| Flyash | 15 to 70 |
| Portland Cement | 25 to 40 |
| Nippon PolyPlex | 1.6 to 5.0 |
| Sand | 40 to 55 |

One embodiment of the coating formulation also includes styrene, rubber and chopped nylon fibers. These optional materials are present in concentrations ranging from 0 to 5 percent by weight, depending upon the application. Particle sizes for these materials fall within the range of other dry ingredients.

The formulation of the present invention is free from water other than water in the curing agent and any water in the particulate ingredients. The coating formulation is applied to a surface to be treated, such as a utility pole or a transmission tower, by spraying the coating onto the surface.

In one preparation and application embodiment, illustrated schematically in a pumping system, shown generally at 10 in FIG. 1, the dry ingredients are mixed together, in a conventional mixer 1, and, once mixed, are added to a hopper, shown at 20 in FIG. 1. In one embodiment, the pumping system is manufactured by Miefx, Inc. of California. The curing agent is stored in a separate container 22. Water, used for flushing, is stored in a third container 25. The dry ingredients and curing agent are conveyed to a spray nozzle 24, through a conveying mechanism 26 and are mixed together in the spray nozzle 24 within a mixing chamber 27. The conveying mechanism is a conventional mechanism for conveying particles and liquids. Once the ingredients dry mixed to form a mixture, the mixture is discharged from the spray nozzle 24 onto a surface to be coated. The spraying time on the surface area determines the thickness of the coating. Because the coating is sprayed, the coating thickness is uniform and, if desired, is thin.

The flyash used in the coating of the present invention includes particles of a size that enables the coating formulation to be sprayed upon a surface and to cure in situ on the surface that is coated. The flyash includes particles that are, typically, at least about forty percent smaller than ten microns in diameter. The greater the percentage of these small particles, the greater the pozzolanic reaction. The small particles, less than ten microns in diameter, contribute to elevated 7 and 28 day strengths of the coating. Particles between 10 and 45 microns react slowly, between about 28 days and one year. The flyash used in the coating of the present invention has a composition that is less than 20 percent particles of a size that is greater than 45 microns. The carbon content of the flyash is not more than 1.5 percent by weight.

In one embodiment, the flyash is obtained from the Becker Power Plant in Becker, Minn. It is believed that flyash produced by other power plants is suitable for use in the present invention. The concentration of flyash in the coating of the present invention is within a range of 15 to 70 percent by weight.

The coating also includes Portland cement and silica, one form of which is sand. The coating further includes a curing agent. In one embodiment, the curing agent is an acrylic acid, PolyPlex, manufactured for Nippon by UniChem, of Haw River, N.C.

The PolyPlex is an acrylic based, aqueous thermoplastic copolymer dispersion. The molecular weight is about 400,000. The percent solids in the PolyPlex is about 1% by weight. The pH of the PolyPlex is 8–10. The PolyPlex also includes a defoamer that prevents the polymer from foaming during mixing and so entraining air in the final coating product. The PolyPlex is added in a concentration of 5% polymer solids to the weight of dry ingredients. The PolyPlex is typically an emulsion that contains 47% polymer. While PolyPlex is described, it is believed that other acrylic based, aqueous thermoplastic copolymer dispersions are usable as a curing agent in the coating of the present invention.

In one embodiment, the coating further includes styrene and rubber. Other embodiments of the present invention include ingredients such as super plasticizers, water reducers, set accelerators and retarders.

The coating ingredients are blended together in the spray nozzle and sprayed onto the surface to be coated, upon blending. The blending includes dry blending all of the dry ingredients. The dry blending is performed, in some embodiments, in a cement mixer. In other embodiments, the dry ingredients are blended in a paddle mixer, conventionally used to blend dry, particulate materials. In one embodiment, the dry ingredients are blended prior to transportation to an article to be coated. In one embodiment, the blended, dry ingredients are packaged in containers such as five gallon pails, fifty pound sacks or 2000 pound sacks. The containers are transported to stores and sold to the public. Users from the public transfer the containers to a site where the article to be coated is located. The packaged, dry ingredients are, in some embodiments, sold in a kit with the curing agent in a separate container. While particular sizes are described herein, it is understood that containers of many sizes are usable in the present invention.

In one embodiment, the dry ingredients are blended with the curing agent in the pumping system. The blending is performed under high shear and a mixing time that is less than 5 minutes. The pumping system includes separate hoses for conveying the dry ingredients and the curing agent. The dry ingredients and curing agent are separately conveyed and meet in a mixing chamber of a spray gun. One embodiment of the spraying apparatus is shown at 10 in FIG. 1. The apparatus includes a hopper 20 for the dry ingredients and a container 22 for curing agent. The dry ingredients are conveyed through a hose 240 at the bottom of the hopper 20. The dry ingredients are pushed through the hose 240 by an air compressor 260.

When the ingredients are blended together, creating a mixture, the ingredients create an exothermic reaction that elevates the mixture temperature to 200 to 300 degrees Fahrenheit. The heated mixture is atomized to particles having a diameter of 200 to 300 microns in a spray atomizer. The atomized particles include the flyash, curing agent, Portland cement, sand and optional particles and are sprayed onto the surface being coated.

In one embodiment, the flyash coating process is performed using a system for transporting coating materials and a spray device to remote areas. A vehicle such as a truck or an all terrain vehicle is employed for transportation. Ingredients for the coating are stored in one or more storage areas on the vehicle. A spraying device is conveyed by the vehicle. A mixing device is also included. Power for operating the spraying device and mixer is provided by sources that include battery power, auxiliary generator, and power of the vehicle.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A coating, comprising:

flyash in a concentration of 25 to 70 percent by weight of the coating;

Portland cement;

silica; and a curing agent.

2. The coating of claim 1, further comprising, one or more of chopped nylon fiber;

styrene; and, rubber.

3. A transmission tower, comprising:

the coating of claim 1 and a transmission tower, wherein the coating is applied to at least a portion of the transmission tower in situ.

4. A utility pole, comprising:

the coating of claim 1 and a utility pole, wherein the coating is applied to at least a portion of the utility pole in situ.

5. A wood-based structure, comprising:

the coating of claim 1 and a wood-based structure, wherein the coating is applied to at least a portion of the wood-based structure in situ.

6. A method for applying a coating to a wood-based structure, comprising:

preparing a slurry comprising flyash, chopped nylon fiber, Portland cement, silica, a curing agent, styrene, and rubber;

adding the slurry to a sprayer; and spraying the slurry onto the wood-based structure in situ.

7. The method of claim 6, wherein the spraying is performed on a wood-based structure in situ.

8. The method of claim 6 wherein the slurry sprayed includes particles within a size range of 200 to 300 microns.

9. The method of claim 6, further comprising providing a vehicle that includes the sprayer and a container for the flyash.

10. A kit, comprising:

a container; and a particle mixture comprising flyash in a concentration of 25 to 70 percent by weight of the particle mixture;

Portland cement; and silica wherein the particle mixture is contained within the container.

11. The kit of claim 10 wherein the container is a pail.
12. The kit of claim 10 wherein the container is a bag.
13. The kit of claim 10, further comprising another container and a curing agent contained in the container.
14. The kit of claim 10, further comprising a spraying device.
15. A wood-based structure, comprising:
   a coating, comprising:
      flyash in a concentration of 25 to 70 percent by weight of the coating;
      Portland cement;
      silica; and
      a curing agent; and
   a wood-based structure, wherein the coating is applied to at least a portion of the wood-based structure in situ wherein the slurry sprayed includes particles within a size range of 200 to 300 microns.
16. A kit, comprising:
   a container; and
   a particle mixture comprising flyash in a concentration of 25 to 70 percent by weight of the particle mixture;
   Portland cement;
   silica wherein the particle mixture is contained within the container;
   a spraying device; and
   a transporting device for transporting the container, particle mixture, and spraying device to an object that is to be coated.

* * * * *